United States Patent
Neely, Jr.

(10) Patent No.: US 6,428,616 B1
(45) Date of Patent: Aug. 6, 2002

(54) CURABLE COATING COMPOSITIONS

(75) Inventor: James E. Neely, Jr., Butler, PA (US)

(73) Assignee: Neely Industries, Inc., Butler, PA (US)

( * ) Notice: Subject to any disclaimer, the term of this patent is extended or adjusted under 35 U.S.C. 154(b) by 65 days.

(21) Appl. No.: 09/619,335

(22) Filed: Jul. 19, 2000

(51) Int. Cl.$^7$ .......................... C04B 12/04; B05D 3/02; B32B 17/06

(52) U.S. Cl. .................... 106/628; 106/629; 427/397.8; 428/426; 428/427; 428/428; 428/432; 428/688; 428/689

(58) Field of Search ................... 106/628, 629; 427/397.8; 428/426, 427, 428, 432, 688, 689

(56) References Cited

U.S. PATENT DOCUMENTS

| | | | |
|---|---|---|---|
| 3,930,876 A | 1/1976 | Nakajima et al. .............. | 106/74 |
| 4,288,252 A | 9/1981 | Neely ........................... | 106/74 |
| 4,312,673 A | 1/1982 | Neely ........................... | 106/74 |
| 4,312,844 A | 1/1982 | Neely et al. .................. | 423/314 |
| 4,319,926 A | 3/1982 | Nowakowski et al. ........ | 106/74 |
| 4,329,327 A | 5/1982 | Neely et al. .................. | 423/314 |
| 4,333,914 A | 6/1982 | Neely et al. .................. | 423/314 |
| 4,334,941 A | 6/1982 | Neely ........................... | 156/107 |
| 4,412,863 A | 11/1983 | Neely ........................... | 106/84 |
| 4,433,016 A | 2/1984 | Neely ........................... | 428/34 |
| 5,498,284 A | 3/1996 | Neely ........................... | 106/629 |

*Primary Examiner*—Elizabeth D. Wood
(74) *Attorney, Agent, or Firm*—Jack Matalon

(57) ABSTRACT

An aqueous, curable coating composition comprising a mixture of:

(a) at least one water soluble alkali metal silicate; and (b) an effective amount of a water-soluble crosslinking agent comprising an alkali metal aluminophosphate, or an alkali metal aluminoborophosphate, or an ammonia aluminophosphate, or an ammonia aluminoborophosphate, or an alkali metal ammonia aluminophosphate, an alkali metal ammonia aluminoborophosphate, or a mixture of two or more of the foregoing phosphates.

Preferably, the coating composition will not contain any visually discernable precipitate. The coating composition may be applied to a substrate such as a glass, a ceramic, concrete or a metal and thereafter cured by air drying or by heating to a temperature of up to about 240° C. (or higher, if desired).

28 Claims, No Drawings

CURABLE COATING COMPOSITIONS

FIELD OF THE INVENTION

The invention relates to inorganic and organic-modified inorganic curable coating compositions. More particularly, the invention provides aqueous curable coating compositions comprising a mixture of a water-soluble alkali metal silicate and a water-soluble crosslinking agent. The compositions are particularly useful for coating glass, ceramic, concrete and metal articles.

BACKGROUND OF THE INVENTION

Aqueous alkali metal or ammonium silicate compositions containing curing agents are well known, e.g., see U.S. Pat. No. 4,288,252.

In general, the prior art uses alkali metal silicates that are cross-linked with B-form aluminum trimetaphosphate. Cross-linking of the alkali metal silicate is attained by heating an article coated with the aqueous composition to a temperature of 205° C. or higher.

The aqueous prior art composition is typically made by mixing an alkali metal silicate with fillers and/or pigments and placing the mixture in a sealed container. The B-form aluminum trimetaphosphate is mixed in water with or without pigments and fillers and stored in a second sealed container. Prior to use, the materials in each container are mixed together. The separate containers are required since the B-form aluminum trimetaphosphate and alkali silicates undergo a non-cross-linking reaction even at room temperature to produce a solidified mass within about one day. Once the materials from the separate containers are mixed, the resultant composition must be used within eight hours. Thus, this system must be prepared as a two-pack system to prevent this undesirable reaction.

An aqueous, heat-curable coating composition may also be prepared in accordance with U.S. Pat. No. 5,498,284. In the '284 patent, the composition comprises a mixture of a water-soluble alkali silicate and an alkali aluminum phosphate crosslinking agent. However, the crosslinking agent in the '284 patent is difficult and time-consuming to prepare and it is not water-soluble, leading to variable results upon curing due to lack of homogeneity of distribution of the crosslinking agent in the mixture. Furthermore, the coating composition in the '284 patent must be heat-cured at temperatures of up to about 700° C. In contradistinction thereto, the crosslinking agents employed in the present invention are easily prepared, they are water-soluble thus leading to a clear solution upon admixture with the alkali metal silicate, and the coating composition may be readily cured by air drying or by moderate heating, i.e., temperatures above about 240° C. are not necessary for heat curing.

OBJECTS OF THE INVENTION

It is an object of the invention to prepare an aqueous coating composition that is curable by drying in air or by moderate heating, at temperatures of up to about 240° C. or higher if desired.

It is a further object of the invention to prepare an aqueous coating composition that is a clear solution such that the alkali metal silicate and the crosslinking agent are both water-soluble and are fully compatible with one another, thereby avoiding problems associated with a lack of homogeneity of distribution of the crosslinking agent in the alkali metal silicate.

It is yet a further object of the invention to prepare a crosslinking agent by a simple, highly efficient process that will result in a water-soluble material that will be fully compatible with the alkali metal silicate.

These objects and other objects have been achieved by the present invention that is described hereinbelow.

SUMMARY OF THE INVENTION

The present invention is directed to an aqueous, curable coating composition comprising a mixture of a water-soluble alkali metal silicate and a water-soluble crosslinking agent.

The present invention avoids the use of B-form aluminum trimetaphosphate hardener or other curing or hardening agents that have been previously employed and that have an undesirable low temperature reaction with the alkali silicates. In the present invention, it is possible to formulate the composition as a one-pack system since there is no significant low temperature, e.g., room temperature, reaction between the alkali silicate and the crosslinking agent employed in the mixture. This permits the formulation of curable coating compositions as a single container system with a long shelf life. The container should, of course, be sealed until the coating composition is to be applied to the substrate since the composition is capable of being cured at room temperature by air drying (as well as by moderate heating).

Since the coating composition of the present invention employs the use of a water-soluble crosslinking agent, the problems associated with the composition of the '284 patent discussed above may be avoided.

DETAILED DESCRIPTION OF THE INVENTION

The present invention provides aqueous, curable coating compositions comprising at least one water-soluble alkali metal silicate and a water-soluble crosslinking agent. The present invention also provides the method for producing and using such coating compositions. The invention further provides the water-soluble crosslinking agents and the method for their production. Additionally, the invention provides substrates that are coated with the coating composition and subsequently cured.

The aqueous, curable coating compositions of the invention comprise, in addition to water as the only necessary solvent, a mixture of:

(a) at least one water-soluble alkali metal silicate; and (b) an effective amount of a water-soluble crosslinking agent comprising an alkali metal aluminophosphate, an alkali metal aluminoborophosphate, an ammonia aluminophosphate, an ammonia aluminoborophosphate, an alkali metal ammonia aluminophosphate, an alkali metal ammonia aluminoborophosphate or a mixture of two or more of the foregoing phosphates.

The alkali metal silicates employed herein are those that have been previously known for use in the formulation of silicate coating compositions. See for example, U.S. Pat. No. 4,288,252. Although any alkali metal may be employed for the preparation of the silicate and the crosslinking agent, it is preferred that the alkali metal of the water-soluble alkali metal silicate and each of the alkali metals of the water-soluble crosslinking agent independently are sodium, potassium or lithium.

The water-soluble crosslinking agent employed in this invention may be prepared as follows:. An aluminum phosphate, e.g., aluminum dihydrogen phosphate, is reacted in water with at least one alkali metal phosphate (e.g., sodium phosphate, potassium phosphate, lithium phosphate or mixtures thereof) at room temperature. To prepare the ammonia aluminophosphate, ammonia is substituted for the alkali metal phosphate. To prepare the alkali metal ammonia aluminophosphate, a mixture of the alkali metal phosphate (s) and ammonia is used to react with the aluminum phosphate. To prepare the corresponding alkali metal aluminoborophosphate or the corresponding ammonia aluminoborophosphate, a suitable boron compound such as boric acid is also employed as a reactant.

The reaction of the aluminum phosphate with the alkali metal phosphate and/or ammonia as well as the reaction of the aluminum phosphate with the alkali metal phosphate and/or ammonia and the boron compound, in water proceeds rapidly, e.g., in 1–5 minutes, at ambient temperature. The crosslinking agent preferably is not isolated, i.e., the aqueous solution of the crosslinking agent is used as is for subsequent mixing with the water-soluble alkali metal silicate. The water-soluble alkali metal silicate may be mixed as a solid or as an aqueous solution with the aqueous solution of the crosslinking agent to thereby form the aqueous, curable coating composition of the invention.

The amounts of the reactants employed in the preparation of the aqueous solution of the crosslinking agent will be approximately stoichiometric in nature. However, it is preferred that the amounts of the reactants be such that the pH of the aqueous solution of the crosslinking agent will be above about 5.0, preferably above 7.0. It is also preferred that the amounts of the reactants employed in the preparation of the aqueous solution of the crosslinking agent be such that the resultant solution is "clear" in appearance. For the purpose of this invention, the term "clear" should be understood as meaning that the solution may have a visually transparent or a visually cloudy appearance, but there are no visibly discernable solids present in the solution, i.e., either in suspension or as a precipitate.

The weight ratio of solids of the water-soluble alkali metal silicate to the water-soluble crosslinking agent is in the range of about 3:1 to about 500:1, preferably 10:1 to 100:1. The amount of water present in the composition is not critical; the amount of water used will determine the viscosity of the composition that may be varied to meet the requirements of the selected method of application of the composition on the desired substrate. Typically, the water will be present in the range of about 25 to about 95 wt. %, preferably 45 to 75 wt. %, based on the weight of the composition.

The coating composition of the invention is easily applied to any substrate, e.g., a glass, a ceramic, concrete or a metal. The resultant coated substrate may then be cured by air drying or by moderate heating. The time required for curing will be somewhat dependent upon the concentration of the solids in the aqueous solution and also dependent upon the ambient temperature and relative humidity in the case of air drying or the temperature and the mass of the substrate in the case of heat-curing. Typically, the time for achieving a complete cure will range from several minutes to 2–3 hours in the case of curing by air drying, while heat-curing will typically require a curing time of several minutes to about one hour. The degree and speed of curing of the coated substrate may be enhanced by passing an air stream over the coated substrate, e.g., with a fan. The optimum degree of durability of the coating is achieved by heat-curing the coated substrate. The temperature utilized for heat-curing is not critical. It has been found that the heat-curing temperature need not exceed about 240° C. However, heat-curing temperatures in excess of 240° C. are possible, particularly if the manufacturing operations associated with the production of coated substrates typically employ such higher temperatures.

A wide variety of coatings with a variety of properties may be readily achieved by incorporating one or more materials in the aqueous curable coating compositions of the present invention. Such materials, if present, preferably should not be present in an amount of greater than about 90 wt. %, based on the weight of the composition. Useful materials for incorporation in the coating compositions of the invention include one or more resins, one or more fillers, one or more inorganic pigments, one or more organic pigments, one or more dyes, one or more surfactants, one or more defoamers and one or more coupling agents. These materials should, of course, be stable at the curing temperature employed when the coating composition is applied to the substrate and subsequently cured.

For the purpose of the present invention, the term "resins" should be understood to mean polymeric entities that may range from low molecular weight oligomers to high molecular weight complex polymers and from low viscosity mobile liquids to plastic solids. The resins may be thermoplastic, thermosetting, elastomeric or thermoplastic-elastomeric in nature and may be incorporated in the coating composition of the invention neat or as a solution or dispersion of the polymeric entity in an aqueous or non-aqueous, non-reactive solvent that will be compatible with the components of the coating composition (typical solvents would include water, glycols, hydrocarbons, etc.). Such resins may be used in the amount of about 1 to about 90 wt. %, preferably 5 to 30 wt. %, based on the weight of the composition. Suitable resins include polyolefins such as polyethylene and polypropylene; ethylene-propylene copolymers; ethylene-propylene-diene monomer terpolymers; nylons; polycarbonates, poly(meth) acrylates; polyesters, epoxy resins; alkyd resins, hydrocarbon resins; vinyl resins, etc.

In addition to, or in lieu of the resins, one or more fillers may be added to the coating compositions of the invention. Such fillers may be used in amounts of up to about 60 wt. %, preferably up to 50 wt. %, based on the weight of the composition. The fillers may be naturally occurring minerals or man-made oxides or other inorganic materials. Suitable fillers include talc, silica, feldspar, mica, wallstonite, alumina, zirconia, graphite, silicon carbide, oxide glasses, silver, steel, iron and the like.

In addition to, or in lieu of the resins and/or the fillers, one or more inorganic pigments may be added to the coating compositions of the invention. Such inorganic pigments may be used in amounts of up to about 50 wt. %, based on the weight of the composition. Suitable inorganic pigments include ferrous/ferric oxide, ferric oxide, titanium dioxide, copper chromite, manganese ferrite, chromium hematite, cobalt-zinc aluminate, zinc oxide, carbon black, zinc sulfide, calcium carbonate, hydrated aluminum silicate, copper powder and the like.

In addition to, or in lieu of the resins, fillers and/or the inorganic pigments, one or more organic pigments may be added to the coating compositions of the invention. Such organic pigments may be used in amounts of up to about 40 wt. %, based on the weight of the composition. Suitable organic pigments include the mono-and diarylide yellows, dinitroaniline orange, pyrazolone orange, diarylide orange, the naphthol reds, toluidine red, the rubine reds, the lithol reds, pmta deep green, phthalocyanine green, pmta brilliant blue, the phthalocyanine blues, copper ferrocyanide blue, ultramarine violet, crystal violet, dioxazine violet b and the like.

The coating compositions of the invention may also include minor amounts, e.g., about 0.1 to about 5 wt. %, based on the weight of the composition of one or more dyes such as acid dyes, azoic dyes, basic dyes, direct dyes, disperse dyes, mordant dyes, natural dyes, solvent dyes, sulfur dyes, vat dyes and the like. The coating compositions may also contain very minor amounts, e.g., about 0.001 to about 1 wt. %, based on the weight of the composition, of one or more surfactants and/or one or more defoamers (or materials having both surfactant and defoaming properties) and/or one or more coupling agents. The surfactants may be of the anionic, cationic, nonionic and/or amphoteric types. Suitable defoamers include non-silicone as well as the preferred silicone fluids and emulsions. Coupling agents are well known in the prior art and typically comprise organosilanes, organotitanates and organozirconates.

The coating compositions of the invention have been found to be particularly suitable as functional or decorative coatings for glass, ceramic, concrete and metals substrates. The coating compositions of the invention may be applied to the selected substrate by conventional methods such as spraying, brush coating, roll coating, screen printing, etc. and the resultant coated substrate may then be cured by air drying at room temperature or by heating to a temperature of up to about 240° C. as discussed above. In accordance with recognized coating techniques, the surface of the selected substrate should be clean, i.e., free from cutting oils, greases, fingerprints, dust, etc. prior to application of the coating composition of the invention.

The following non-limiting examples shall serve to illustrate the invention. Unless otherwise indicated, all amounts, ratios and percentages are on a weight basis.

EXAMPLE 1

A water-soluble crosslinking agent was prepared by stirring 15 g of a 50% solution of aluminum dihydrogen phosphate with 15 g of sodium pyrophosphate in 200 g of water at room temperature until a clear solution was obtained.

EXAMPLE 2

Example 1 was repeated, except that 11.6 g of a 50% solution of aluminum dihydrogen phosphate, 10 g of boric acid and 30 g of sodium tripolyphosphate in 130 g of water were stirred together at room temperature to form a clear solution.

EXAMPLE 3

Example 1 was repeated, except that stoichiometric quantities of a 50% solution of aluminum dihydrogen phosphate and a 30% solution of ammonium hydroxide were stirred together at room temperature to form a clear solution.

EXAMPLE 4

Example 2 was repeated, except 24 g of a 30% solution of ammonium hydroxide were substituted for the sodium tripolyphosphate and the amount of water was 300 g.

EXAMPLE 5

Example 1 was repeated using 20 g of a 50% solution of aluminum dihydrogen phosphate, 10 g of sodium pyrophosphate and 12 g of a 30% solution of ammonium hydroxide in 250 g of water.

EXAMPLE 6

Example 1 was repeated using 11.6 g of a 50% solution of aluminum dihydrogen phosphate, 10 g of boric acid, 8 g of sodium tripolyphosphate and 6 g of a 30% solution of ammonium hydroxide in 130 g of water.

EXAMPLE 7

A curable coating composition was prepared by mixing 240 g of a potassium silicate solution having a silica/alkali oxide ratio of 2.5/1 with 19 g of the crosslinking agent solution prepared in Example 4, together with 55 g of water, 10 g of silica and 15 g of alumina. The resultant coating composition was applied to a glass substrate and the coated substrate was heated in an oven at 240° C. for 30 minutes to produce a durable coated glass article.

EXAMPLE 8

A curable coating composition was prepared by mixing 160 g of a potassium silicate solution having a silica/alkali oxide ratio of 2.5/1 and 80 g of a sodium silicate solution having a silica/alkali oxide ratio of 4/1 with 10.3 g of the crosslinking agent solution prepared in Example 2, together with 50 g of water, 30 g of silica and 40 g of alumina. The resultant coating composition was applied to a glass substrate and the coated substrate was cured by heating in an oven at 240° C. for 20 minutes.

EXAMPLE 9

A curable coating composition was prepared by mixing 240 g of a potassium silicate solution having a silica/alkali oxide ratio of 2.5/1 with 9 g of the crosslinking agent solution prepared in Example 6, together with 5 g of silica, 10 g of alumina and 2 g of clay. The resultant coating composition was applied to a glass substrate and the coated substrate was cured by heating in an oven at 200° C. for 20 minutes.

EXAMPLE 10

A curable coating composition may be prepared by mixing 120 g of a potassium silicate solution having a silica/alkali oxide ratio of 2.5/1 and 100 g of a sodium silicate solution having a silica/alkali oxide ratio of 4/1 with 25 g of the crosslinking agent solution prepared in Example 1, 40 g of water, 12 g of silica, 20 g of one or more inorganic pigments, 5g of one or more organic pigments and a total of up to 1 wt. % of one or more surfactants, defoamers and/or coupling agents. The resultant coating composition may be applied to substrates to produce colored-coated substrates which may then be cured by air drying or heating, e.g., to a temperature of up to 240° C. (or if desired).

What is claimed is:

1. An aqueous, curable coating composition comprising a mixture of:
   (a) at least one water-soluble alkali metal silicate; and
   (b) an effective amount of a water-soluble crosslinking agent comprising an alkali metal aluminophosphate, or an alkali metal aluminoborophosphate, or an ammonia aluminophosphate, or an ammonia aluminoborophosphate, or an alkali metal ammonia aluminophosphate, or an alkali metal ammonia aluminoborophosphate, or a mixture of two or more of the foregoing phosphates.

2. The composition of claim 1 wherein the weight ratio of solids of the water-soluble alkali metal silicate to the water-soluble crosslinking agent is in the range of about 3:1 to about 500:1.

3. The composition of claim 2 wherein the weight ratio of solids of the water-soluble alkali metal silicate to the water-soluble crosslinking agent is in the range of 10:1 to 100:1.

4. The composition of claim 1 wherein an aqueous solution of the crosslinking agent is such that no visually discernable solids are present in the solution.

5. The composition of claim 1 wherein an aqueous solution of the crosslinking agent has a pH above about 5.0.

6. The composition of claim 5 wherein the pH of the aqueous solution of the crosslinking agent is above 7.0.

7. The composition of claim 1 further comprising at least one material selected from the group consisting of one or more resins, one or more fillers, one or more inorganic pigments, one or more organic pigments, one or more dyes, one or more surfactants, one or more defoamers and one or more coupling agents and mixtures thereof.

8. The composition of claim 7 wherein the total amount of all materials present in the composition is not greater than about 90 wt. %, based on the weight of the composition.

9. The composition of claim 7 wherein the total amount of all resins present in the composition is not greater than about 90 wt. %, based on the weight of the composition.

10. The composition of claim 7 wherein the total amount of all fillers present in the composition is not greater than about 60 wt. %, based on the weight of the composition.

11. The composition of claim 7 wherein the total amount of all inorganic pigments present in the composition is not greater than about 50 wt. %, based on the weight of the composition.

12. The composition of claim 7 wherein the total amount of all in organic pigments present in the composition is not greater than about 40 wt. %, based on the weight of the composition.

13. The composition of claim 1 wherein the alkali metal of the water-soluble alkali metal silicate and each of the alkali metals of the water-soluble crosslinking agent independently comprise sodium, potassium or lithium.

14. A method for preparing a coated substrate that comprises applying the composition of claim 1 to such substrate and subjecting the resultant substrate to curing by air drying or by heating to a temperature of up to about 240° C.

15. The method of claim 14 wherein the substrate comprises a glass, a ceramic, concrete or a metal.

16. A method for preparing a coated substrate that comprises applying the composition of claim 7 to such substrate and subjecting the resultant substrate to curing by air drying or by heating to a temperature of up to about 240° C.

17. The method of claim 16 wherein the substrate comprises a glass, a ceramic, concrete or a metal.

18. A method for preparing a coated substrate that comprises applying the composition of claim 8 to such substrate and subjecting the resultant substrate to curing by air drying or by heating to a temperature of up to about 240° C.

19. The method of claim 18 wherein the substrate comprises a glass, a ceramic, concrete or a metal.

20. A method for preparing a coated substrate that comprises applying the composition of claim 9 to such substrate and subjecting the resultant substrate to curing by air drying or by heating to a temperature of up to about 240° C.

21. The method of claim 20 wherein the substrate comprises a glass, a ceramic, concrete or a metal.

22. A method for preparing a coated substrate that comprises applying the composition of claim 10 to such substrate and subjecting the resultant substrate to curing by air drying or by heating to a temperature of up to about 240° C.

23. The method of claim 22 wherein the substrate comprises a glass, a ceramic, concrete or a metal.

24. A method for preparing a coated substrate that comprises applying the composition of claim 11 to such substrate and subjecting the resultant substrate to curing by air drying or by heating to a temperature of up to about 240° C.

25. The method of claim 24 wherein the substrate comprises a glass, a ceramic, concrete or a metal.

26. A method for preparing a coated substrate that comprises applying the composition of claim 12 to such substrate and subjecting the resultant substrate to curing by air drying or by heating to a temperature of up to about 240° C.

27. The method of claim 26 wherein the substrate comprises a glass, a ceramic, concrete or a metal.

28. A coated glass, ceramic, concrete or metal substrate prepared in accordance with any of claims 14, 16, 18, 20, 22, 24 or 26.

* * * * *